United States Patent
Yamagiwa

[11] Patent Number: 6,159,403
[45] Date of Patent: Dec. 12, 2000

[54] METHOD OF MANUFACTURING SEALANT CONTAINING TIRE TUBE AND VULCANIZING APPARATUS THEREFOR

[75] Inventor: Toshio Yamagiwa, Saitama, Japan

[73] Assignee: Honda Giken Kogyo Kabushiki Kaisha, Tokyo, Japan

[21] Appl. No.: 09/261,736

[22] Filed: Mar. 3, 1999

[30] Foreign Application Priority Data

Mar. 4, 1998 [JP] Japan .................... 10-069468

[51] Int. Cl.⁷ ............... B29C 35/00; B29D 23/24
[52] U.S. Cl. ............ 264/154; 264/502; 264/163; 264/326; 156/115; 156/119; 156/122; 425/32; 425/292; 425/298
[58] Field of Search ............... 264/154, 155, 264/163, 502, 315, 326; 156/115, 119, 122; 152/503, 506, 507; 425/28.1, 32, 58, 292, 298

[56] References Cited

U.S. PATENT DOCUMENTS

| | | | |
|---|---|---|---|
| 1,841,886 | 1/1932 | Gammeter | 264/163 |
| 4,382,834 | 5/1983 | Satzler | 264/163 |
| 4,388,261 | 6/1983 | Codispoti et al. | 156/115 |
| 5,900,088 | 5/1999 | Yamagiwa | 156/115 |

FOREIGN PATENT DOCUMENTS

| | | | |
|---|---|---|---|
| 55-135615 | 10/1980 | Japan | 264/163 |
| 9-174710 | 7/1997 | Japan . | |

*Primary Examiner*—Mathieu D. Vargot
*Attorney, Agent, or Firm*—Birch, Stewart, Kolasch & Birch, LLP

[57] ABSTRACT

To provide a method of manufacturing a sealant containing tire tube, which is capable of simply opening a sealant filling hole without use of any specialized jig, and a vulcanizing die therefor. A vulcanizing die includes an upper die, a lower die, and a filling hole opening device. The filling hole opening device includes a linear actuator, a drive shaft, and a cutter. The lower die has a cutter passage which passes through the vulcanizing die from outside to inside, and a cut piece recovery passage which extends from the outside of the vulcanizing die to a portion, near the inner opening end, of the cutter passage. The drive shaft of the linear actuator is inserted in the cutter passage, and the cutter is fixed to one end of the drive shaft.

10 Claims, 4 Drawing Sheets

METHOD OF MANUFACTURING SEALANT CONTAINING TIRE TUBE AND VULCANIZING APPARATUS THEREFOR

BACKGROUND OF THE INVENTION

1. Field of the Invention

The present invention relates to a method of manufacturing a tire tube and a vulcanizing apparatus therefor, and particularly to a method of manufacturing a sealant containing tire tube including an air chamber filled with air and a sealant chamber filled with a sealant, and a vulcanizing apparatus therefor.

2. Description of Related Art

FIG. 1 is a transverse sectional view of a wheel mounted with a tube having a tire including a sealant chamber. Referring to FIG. 1, a rim R of the wheel for a motorcycle is connected to a hub (not shown) via wire spokes (not shown).

A tire containing a tube T includes a tire 1 and a tube 2 contained in the tire 1 that are mounted on the rim R. The tube 2 includes a peripheral wall 4 and a partition wall 5 for partitioning the inside surrounded by the peripheral wall 4 into two parts. The peripheral wall 4 is composed of an air chamber peripheral wall 41 positioned radially inwardly of the tube 2, and a sealant chamber peripheral wall 40 positioned radially outwardly of the tube 2. The partition wall 5 is molded integrally with the peripheral wall 4.

An air chamber 3, which is surrounded by the air chamber peripheral wall 41 and the partition wall 5 in an approximately circular shape in cross-section, is filled with air. A sealant chamber 7, which is surrounded by the sealant chamber peripheral wall 40 and the partition wall 5 in an approximately arcuate shape, is filled with a known liquid sealant 8. The air chamber peripheral wall 41 has an air valve 6 for filling the air chamber 3 with air.

FIG. 4 illustrates the manufacturing steps up to and including the step of forming a tube of raw material into a tubular shape. Specifically, the above steps include a material kneading step, a tube material extrusion-molding step, a cutting step, an air valve mounting step, and a joining step.

A material composed of a crude rubber kneaded at the material kneading step is extrusion-molded into a tube material 2' by an extrusion-molding machine at the tube material extrusion-molding step. The tube material 2' is cut into a specific length during the cutting step. An air valve 6 is mounted at a suitable position on the air chamber peripheral wall 4 at the air valve mounting step. Thereafter, both ends of the tube material 2' are joined to each other at the joining step.

According to the related art method disclosed, for example, in Japanese Patent Laid-Open No. Hei 9-174710, the crude rubber, which has been formed into a tubular shape in accordance with the manner described above, is then subjected to the manufacturing steps shown as "related art steps" on the left side of FIG. 6.

At a vulcanizing die set step, as shown in FIG. 5, the annular tube material 2' is set in a vulcanizing die 18. At a first vulcanizing step, the vulcanizing die 18 is heated to vulcanize the tube material 2', thereby forming a tube 2. The tube 2 ejected from the vulcanizing die 18 at a vulcanizing die ejection step is fixed by a specialized jig (not shown) at a fixing step. At a perforating step, a sealant filling hole is opened in the sealant chamber peripheral wall 40.

Then, at a sealant filling step, the sealant chamber 7 is filled with a sealant 8 through the sealant filling hole. At a crude rubber sheet sticking step, a crude rubber sheet is stuck in such a manner so as to cover the sealant filling hole, and at a second vulcanizing step, the crude rubber sheet and its neighborhood are locally vulcanized to close the sealant filling hole, to obtain a finished tube.

SUMMARY AND OBJECTS OF THE INVENTION

To open the sealant filling hole in the tube, the tube is required to be fixed. According to the above-described related art method, since the sealant filling hole is opened at the perforating step subsequent to the first vulcanizing step, the tube ejected from the heating die 18 must be fixed using the specialized jig provided separately from the heating die 18. As a result, in the related art method, it is required not only to additionally provide the specialized jig, but also to additionally provide the steps of fixing the tube on the specialized jig and releasing the fixture of the tube therefrom. This causes a problem in increasing the number of the manufacturing steps.

Another problem of the related art method is that it is difficult to open the sealant filling hole because the tube in the state after the first vulcanizing step is harder than the tube in the state before vulcanization.

An object of the present invention is to solve the above-described problem of the related art method, and to provide a method of manufacturing a sealant containing tire tube and a vulcanizing apparatus therefor, which is capable of simply opening a sealant filling hole without use of any specialized jig.

To achieve the above object, the present invention provides the following means:

(1) A method of manufacturing a sealant containing tire tube which includes an air chamber filled with air and a sealant chamber filled with a sealant, the method including: a first step of forming, by extrusion-molding, a tube material in which the inside of a peripheral wall having an approximately circular shape in cross section is partitioned by a partition wall into an air chamber and a sealant chamber; a second step of joining both ends of the tube material to each other in an annular shape; a third step of setting the annular tube material in a vulcanizing die; a fourth step of heating the vulcanizing die, thereby vulcanizing the tube material to form a tube; a fifth step of ejecting the tube thus vulcanized from the vulcanizing die; a sixth step of filling the sealant chamber with a sealant through a sealant filling hole; and a seventh step of closing the sealant filling hole; wherein at the third and fourth steps, the sealant filling hole communicated to the sealant chamber is opened in the peripheral wall of the tube material having been set in the vulcanizing die.

(2) A vulcanizing apparatus for vulcanizing a tire tube material inserted in a specific die, the tire tube material having a configuration in which the inside of a peripheral wall formed into an approximately circular shape in cross-section is partitioned by a partition wall into an outer peripheral side sealant chamber and an inner peripheral side air chamber, the apparatus including: filling hole opening means for opening a sealant filling hole communicated to the sealant chamber by cutting off part of the peripheral wall.

According to the configuration (1), since the sealant filling hole is opened in the tube material in the state in which the tube material is set in the vulcanizing die, it is possible to eliminate the necessity of providing the specialized jig for fixing the tube material and of providing the steps of fixing the tube material using the specialized jig and releasing the fixture of the tube material therefrom, and hence to simplify the manufacturing steps.

According to the above configuration (2), it is possible to open the sealant filling hole in the tube material in the state in which the tube material is set in the vulcanizing die.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 4:
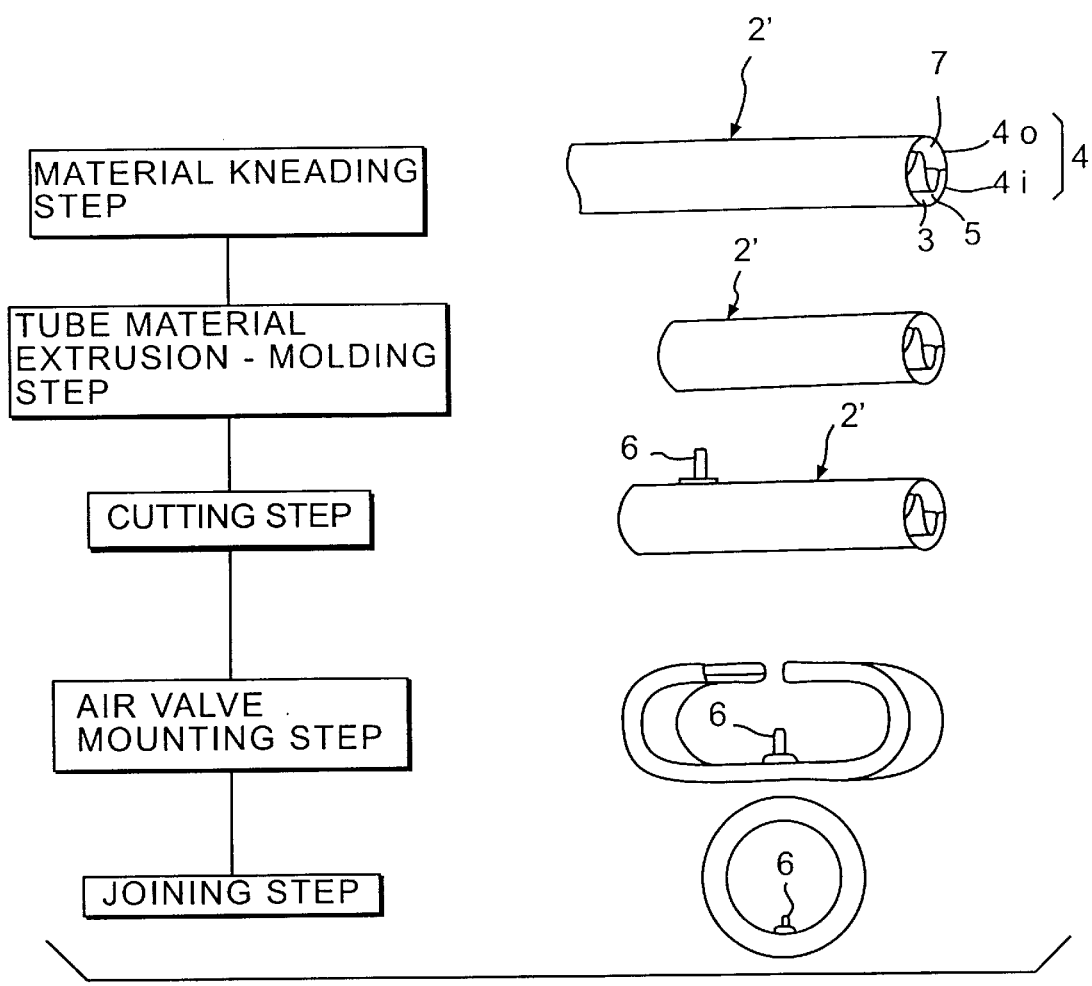
FIG. 4 is a flow chart showing steps of manufacturing a tube.
Figure 5:
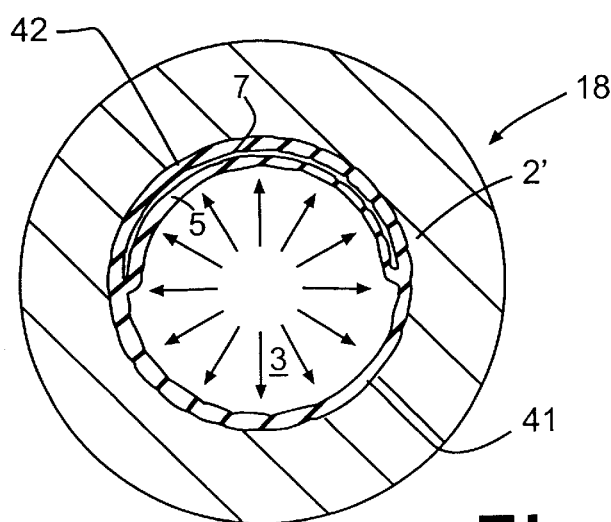
FIG. 5 is a sectional view showing the configuration of a related art vulcanizing die.
Figure 6:
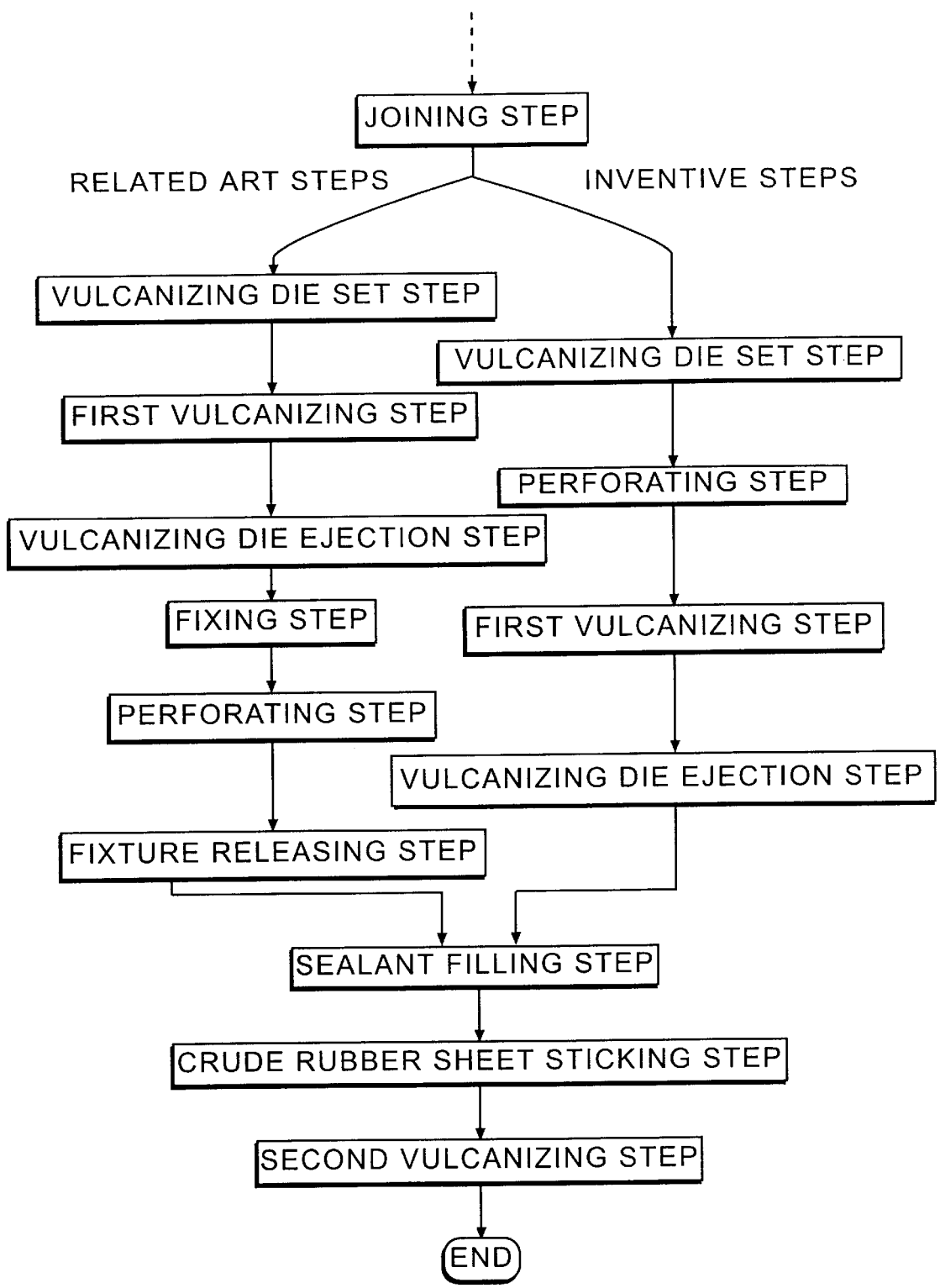
FIG. 6 is a flow chart showing manufacturing steps of the present invention and related art manufacturing steps.

Hereinafter, the present invention will be described in detail with reference to the drawings. A method of manufacturing a sealant containing tire tube according to a first embodiment of the present invention is shown on the right side of FIG. 6. The steps up to and including the joining step for forming a tube of raw material into a tubular shape are the same as those in the related art method described with reference to FIG. 4, and therefore, illustration and description thereof are omitted.

Figure 1:
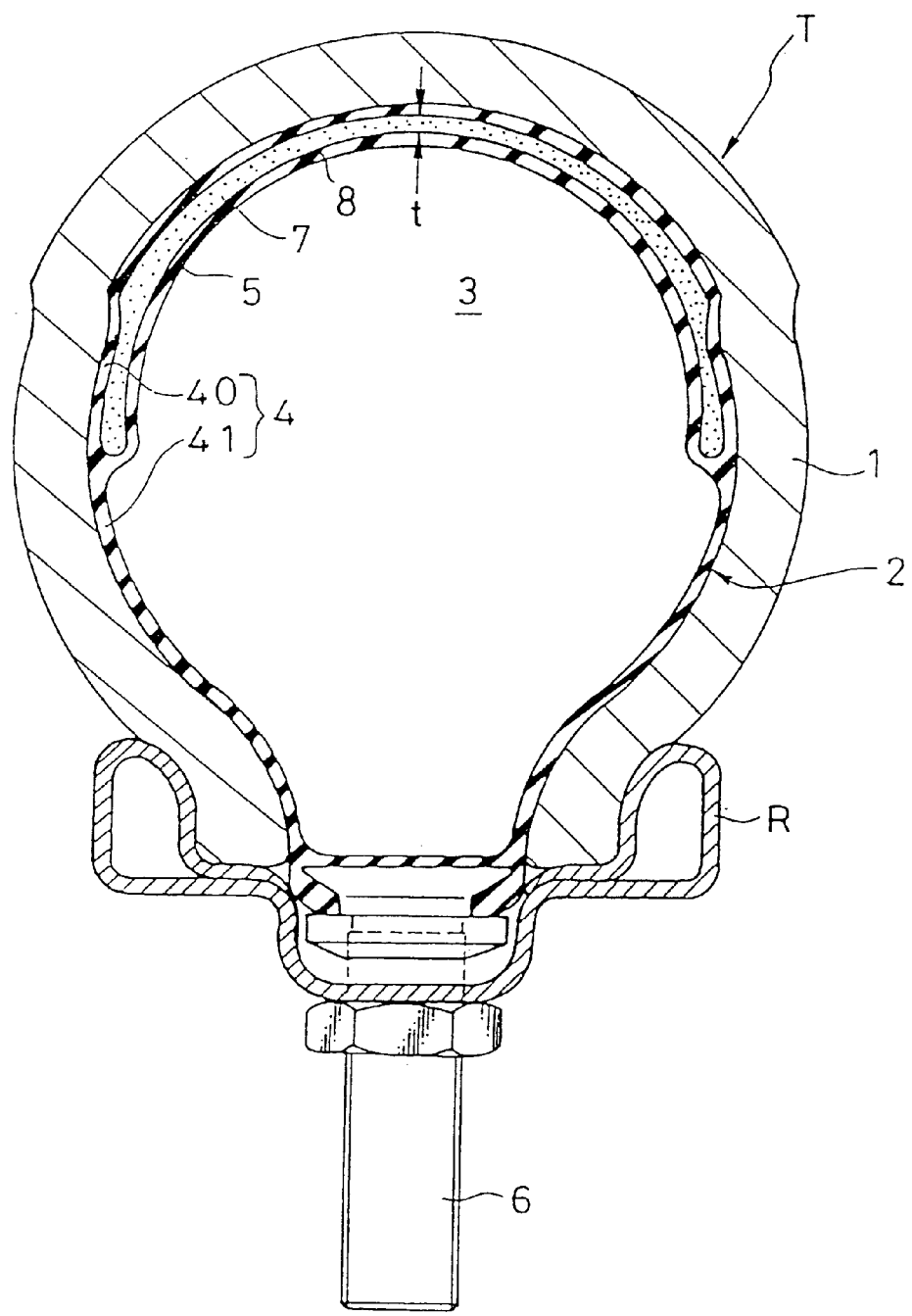
FIG. 1 is a transverse sectional view of a wheel mounted with a tire containing a tube including a sealant chamber.
Figure 2:
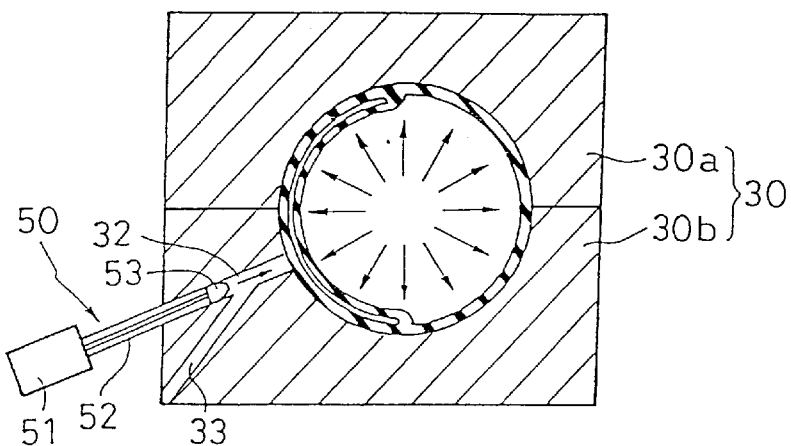
FIG. 2 is a sectional view showing the configuration of a vulcanizing die according to a second embodiment of the present invention.

After completion of the joining step, the annular tube material 2' is set in a vulcanizing die at a vulcanizing die set step. FIG. 2 is a sectional view showing the configuration of a vulcanizing die 30 constituting a vulcanizing apparatus according to a second embodiment of the present invention. The vulcanizing die 30 includes an upper die 30a, a lower die 30b, and a filling hole opening device 50 to be described later. The lower die 30b has a cutter passage 32 which passes through the vulcanizing die 30 from outside to inside, and a cut piece recovery passage 33 which extends from the outside of the vulcanizing die 30 to a portion, near the inner opening end, of the cutter passage 32.

A drive shaft 52 of a linear actuator 51 is inserted in the cutter passage 32, and as will be described later, a cutter 53 having a leading end around which a cutter blade 53a is mounted is fixed to one end of the drive shaft 52. The linear actuator 51, drive shaft 52, and cutter 53 constitute the filling hole opening device 50 for opening a sealant filling hole in a peripheral wall 4 of the tube material 2'.

Figure 3:
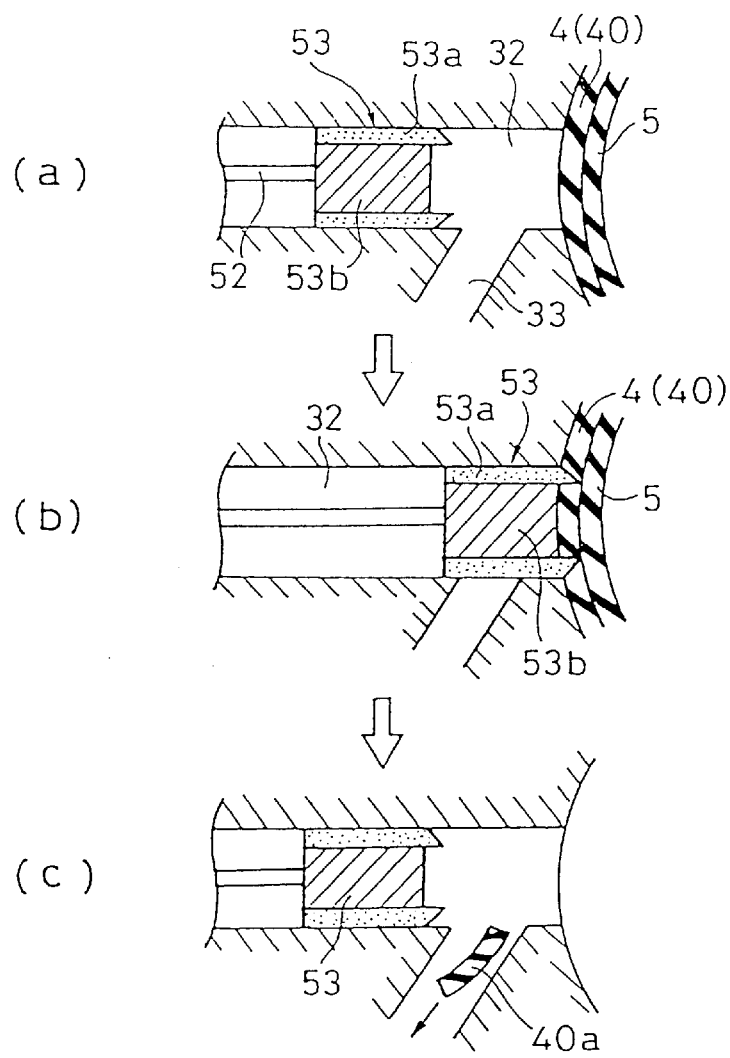
FIGS. 3(a), 3(b) and 3(c) are sectional views showing the actions of a filling hole opening device 50 additionally provided in the vulcanizing die.

At a perforating step subsequent to the vulcanizing die set step, a sealant filling hole is opened in a sealant chamber peripheral wall 40 by the filling hole opening device 50. FIGS. 3(a), 3(b) and 3(c) are sectional views showing the actions of the filing hole opening device 50.

When the tube material 2' is set in the vulcanizing die 30, as shown in FIG. 3(a), the linear actuator 51 is kept in the retreated state. After the setting of the tube material 2' in the vulcanizing die 30 is completed, hot air or high temperature steam is supplied into an air chamber 3 of the tube material 2' through an air valve 6, to bring an air chamber peripheral wall 41 and the sealant chamber peripheral wall 40 in tight contact with the vulcanizing die 30, and also to bring a partition wall 5 in tight contact with the sealant chamber peripheral wall 40.

By energizing the linear actuator 51 in such a state, the cutter 53 is moved forward in the cutter passage 32 as shown in FIG. 3(b), and the annular cutter blade 53a mounted at the leading end of the cutter 53 cuts a portion of the sealant chamber peripheral wall 40 into an annular shape. In this embodiment, a stopper 53b is provided on the inner side of the cutter blade 53a. The biting amount of the cutter blade 53a is restricted by the stopper 53b. As a result, the cutter blade 53a does not reach the partition wall 5, and selectively cuts only the peripheral wall 40.

Alternatively, the linear actuator 51 may be held in the vulcanizing die 30 at the position shown in FIG. 3(b) before the tube material 2' is set in the vulcanizing die 30. With this configuration, when the tube material 2' is set in the vulcanizing die 30 and then a gas such as air is supplied into the tube material 2', the tube material 2' is expanded and thereby a portion of the sealant chamber peripheral wall 40 is cut into an annular shape by the cutter blade 53a. This makes it possible to eliminate the work of moving forward the cutter 53 by energizing the linear actuator 51, and hence to simplify the manufacturing steps.

Next, at a first vulcanizing step, the vulcanizing die 30 is heated to vulcanize the tube material 2' to form a tube 2 imparted with an elasticity. After completion of the vulcanization, the tube 2 is ejected from the vulcanizing die 30. After that, as shown in is FIG. 3(c), the linear actuator 51 is energized in the retreating direction. At this time, a suction force toward the outside of the vulcanizing die 30 is applied to the recovery passage 33 by means of suction means (not shown), so that a cut piece 40a cut from the peripheral wall 40 by the cutter blade 53a is discharged to the outside of the vulcanizing die 30 through the recovery passage 33.

The above perforating step is followed by a sealant filling step. It should be noted that the sealant filling step, and the subsequent crude rubber sheet sticking step and second vulcanizing step are the same as those in the above-described related art method, and therefore, the explanation thereof is omitted.

In this way, according to this embodiment, since the cutter blade 53a is inserted into the tube material 2' before the vulcanizing step, even if a small cut is formed in the partition wall 5 or the like by the cutter blade 53a, such a cut is expected to be repaired in the subsequent vulcanizing step. Accordingly, it is possible to eliminate the necessity of enhancing the perforating accuracy at the perforating step so much, and hence to further facilitate the manufacture of the tire tube.

In this embodiment, since the filling hole opening device 50 for opening a sealant filling hole 60 in the tube material 2' is provided in the vulcanizing die 30, it is possible to eliminate the necessity of the provision of any specialized jig for fixing the tube material at the perforating step.

In this embodiment, since the sealant filling hole 60 can be opened in the state in which the tube material 2' is set in the vulcanizing die 30, it is possible to eliminate the necessity of the provision of the steps of fixing the tube material 2' using a specialized jig and releasing the fixture of the tube material 2' therefrom, and hence to simplify the manufacturing steps.

In this embodiment, since the sealant filling hole 60 is opened in the peripheral wall which is in the relatively soft crude rubber state before vulcanization, it is possible to make the perforation work easier as compared with the related art perforation work in which the sealant filling hole is opened in the hard peripheral wall after vulcanization.

The present invention exhibits the following effects:

(1) Since the filling hole opening device for opening the sealant filling hole in the tube material is provided in the vulcanizing die, it is possible to eliminate the necessity of the provision of any specialized jig for fixing the tube material at the perforating step.

(2) Since the sealant filling hole is opened in the state in which the tube material is set in the vulcanizing die, it is possible to eliminate the necessity of the provision of the steps of fixing the tube material using a specialized jig and releasing the fixture of the tube material therefrom, and hence to simplify the manufacturing steps.

(3) Since the sealant filling hole is opened in the peripheral wall which is in the relatively soft crude rubber state before vulcanization, it is possible to make the perforation work easier as compared with the perforation work in which the sealant filling hole is opened in the hard peripheral wall after vulcanization.

(4) Since the tube material is vulcanized after the sealant filling hole is opened in the tube material, even if a cut is formed in the partition wall or the like at the perforating step, such a cut is expected to be repaired in the subsequent vulcanizing step.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of manufacturing a sealant containing tire tube which includes an air chamber filled with air and a sealant chamber filled with a sealant, said method comprising:

forming, by extrusion-molding, a tube material wherein an inside of a peripheral wall having an approximately circular shape in cross section is partitioned by a partition wall into an air chamber and a sealant chamber;

joining both ends of the tube material to each other in an annular shape;

setting the annular tube material in a vulcanizing die;

opening a sealant filling hole in the peripheral wall of the tube material having been set in the vulcanizing die, said filling hole being in communication with the sealant chamber;

heating the vulcanizing die, thereby vulcanizing the tube material to form a tube;

ejecting the tube thus vulcanized from the vulcanizing die;

filling the sealant chamber with a sealant through a sealant filling hole; and closing the sealant filling hole.

2. The method of manufacturing a sealant containing tire tube according to claim 1, wherein at said filling step, the sealant chamber is filled with the sealant in a state in which the air chamber is filled with air.

3. The method of manufacturing a sealant containing tire tube according to claim 1, wherein said opening step includes the step of moving a cutter into contact with an outer surface of said tube material and thereby cutting an opening in the thickness of said tube material.

4. The method of manufacturing a sealant containing tire tube according to claim 3, wherein said opening step further includes the step of withdrawing the cutter from the surface of the tube material after the opening is cut in the thickness of the tube material to permit a severed piece of the tube material to be discarded.

5. A vulcanizing apparatus for a sealant containing tire tube, said vulcanizing apparatus being adapted to vulcanize a tire tube material, said tire tube material having a configuration in which the inside of a peripheral wall formed into an approximately circular shape in cross section is partitioned by a partition wall into an outer peripheral side sealant chamber and an inner peripheral side air chamber, said apparatus comprising:

a die, the die supporting the tire tube material during vulcanization of the tire tube material; and filling hole opening means for opening a sealant filling hole in communication with the sealant chamber by cutting off a part of the peripheral wall while said tire tube material is supported in said die.

6. The vulcanizing apparatus for a sealant containing tire tube according to claim 5, further comprising a passage in said die through which the cut piece of the peripheral wall is recovered.

7. A vulcanizing apparatus for a sealant containing tire tube, said vulcanizing apparatus being adapted to vulcanize a tire tube material, said tire tube material having a configuration in which the inside of a peripheral wall formed into an approximately circular shape in cross section is partitioned by a partition wall into an outer peripheral side sealant chamber and an inner peripheral side air chamber, said apparatus comprising:

a die, the die supporting the tire tube material during vulcanization of the tire tube material;

a cutter mounted for movement relative to said die for engaging an outer surface of said tire tube;

an actuator for imparting movement to said cutter; and a discharge opening in the die for selectively discharging a portion of said tire tube that is severed by said cutter.

8. The vulcanizing apparatus for a sealant containing tire tube according to claim 7, wherein said cutter includes a stopper for enabling said tire tube to be severed to a predetermined depth.

9. The vulcanizing apparatus for a sealant containing tire tube according to claim 7, wherein the die includes an upper die and a lower die, the cutter being translatable within a passage in the lower die.

10. The vulcanizing apparatus for a sealant containing tire tube according to claim 9, wherein the discharge opening intersects the passage in the lower die.

\* \* \* \* \*